United States Patent Office 2,942,183
Patented June 21, 1960

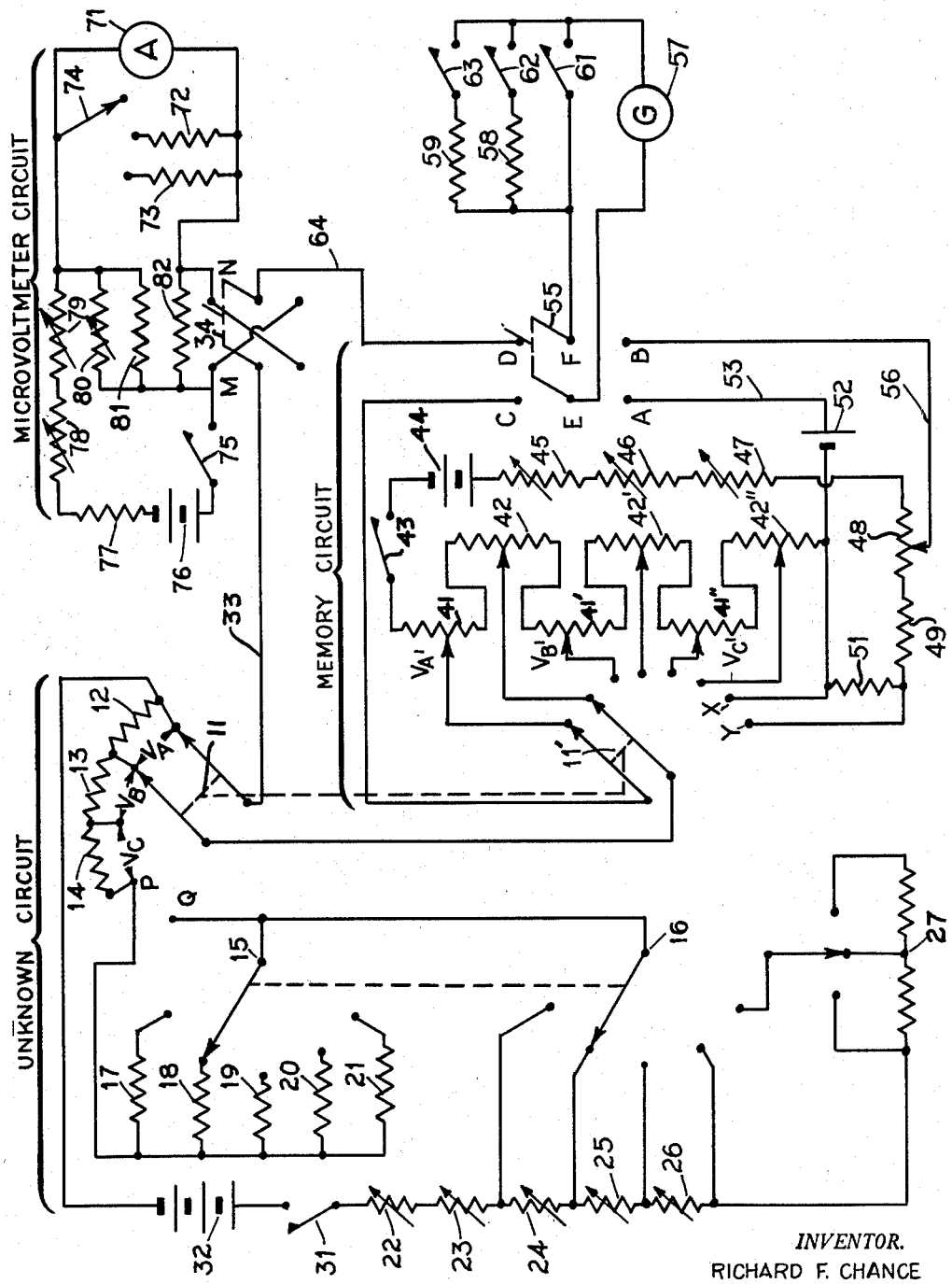
INVENTOR.
RICHARD F. CHANCE

2,942,183
ELECTRICAL MEASURING NETWORK
Richard F. Chance, 3016 Winfield, Indianapolis, Ind.
Filed Nov. 30, 1955, Ser. No. 550,223
1 Claim. (Cl. 324—62)
(Granted under Title 35, U.S. Code (1952), sec. 266)

The invention described herein may be manufactured and used by or for the Government of the United States of America for governmental purposes without the payment of any royalties thereon or therefor.

The present invention relates to electrical measuring networks and more particularly to an electrical measuring circuit for accurately determining the temperature coefficients of resistance elements on a production basis.

Large quantities of precision components are used in electronic equipment that is employed by the armed forces. Much of this equipment, particularly that which is airborne, is subject to large temperature differentials, and it is a well known fact that various electrical components are materially affected by changes in ambient temperatures. Resistance elements are particularly vulnerable to changes in temperature and it is often desirable to know the temperature coefficient of certain resistors so that correction factors can be built into the equipment.

Heretofore the most common method of determining the temperature coefficient of a resistance element consisted of taking two very accurate resistance measurements at different temperatures. The temperature coefficient was then calculated from the formula:

$$a = \frac{R_2 - R_1}{R_1(T_2 - T_1)}$$

in which:

$a$ = temperature coefficient
$R_1$ = resistance in ohms at temperature $T_1$
$R_2$ = resistance in ohms at temperature $T_2$ The old method of determining temperature coefficients by taking separate resistance readings at different temperatures required the use of an expensive resistance bridge and the entire procedure was slow and consequently costly. Also the resistance of the lead wires used for hookup affected the overall accuracy of the procedure and also when a resistor having a low temperature coefficient was checked the change of resistance was low and this change appeared at the low end of the bridge, consequently the accuracy of the readings were in doubt.

The present invention overcomes the inherent disadvantages of heretofore available methods of determining temperature coefficients by providing an electrical network that determines change in resistance. A resistance measurement is taken at a given temperature, the value of the measurement then being converted into a voltage drop by passing an accurately standardized current through the resistors. This initial voltage drop is stored in a "memory" circuit and the resistor being tested is then placed in a temperature environment chamber, usually a deep freezer, and after stabilization a new voltage drop is obtained and compared with the initial voltage drop. The difference is read on a precision meter.

The present invention readily lends itself to quantity production testing since a large number of resistors can be checked at the same time. The "memory" circuit can be adapted to handle any number of voltage values and would only be limited by the physical size desired in the overall unit. Since the present invention provides an output that represents a change in resistance, the effect of lead wire and switch contacts is eliminated and a temperature coefficient of only a few parts per million can be ascertained. Also the use of a costly bridge has been eliminated and the entire process has been expedited.

It is therefore a general object of the present invention to provide an electrical network that will expedite the determination of temperature coefficients of resistance elements and provide a more accurate determination of this value.

Another object of the present invention is to provide an electrical network that will provide an output reading that represents a change in resistance value due to a change of ambient temperature.

Other objects and many of the attendant advantages of this invention will be readily appreciated as the same becomes better understood by reference to the following detailed description when considered in connection with the accompanying drawing, wherein the figure shows a schematic circuit diagram of a measuring network embodying the principles of the invention.

Referring now to the drawing, which is a circuit diagram illustrating a preferred embodiment of the invention, it can be seen that the network is composed of three main groups, which for the purpose of giving a clear description, have been designated as an "unknown" circuit, a "microvoltmeter" circuit, and a "memory" circuit.

The "unknown" circuit, so called because it is in this group that resistors of unknown temperature coefficient are connected, has a switching means 11, such as a rotary switch, and resistors 12, 13, and 14 having end terminals, are shown connected to the terminals of the switching means 11. For purpose of illustration, a unit capable of accommodating and checking three resistors, namely 12, 13, and 14, was chosen, however, it should be understood that there is no intention to so limit the scope of the invention, for any number, either greater or smaller than three could be as readily devised. For example, a unit capable of handling ten resistors at a time has been built for the Department of the Navy and has been operating very successfully.

A second switching means 15 and a third switching means 16 are also part of the "unknown" circuit portion and it can be seen that various combinations of resistance can be placed in series with resistors 12, 13, and 14. The following table lists the values which may be employed for the various resistors of the "unknown" circuit portion:

| Resistor No.: | Value in ohms |
|---|---|
| 17 | 10 |
| 18 | 100 |
| 19 | 1000 |
| 20 | 10,000 |
| 21 | 100,000 |
| 22 | 0–10 |
| 23 | 0–100 |
| 24 | 0–1000 |
| 25 | 0–10,000 |
| 26 | 0–100,000 |
| 27 | 10,000–100,000 |

A switch 31 and a voltage supply 32 complete that portion of the invention herein called the "unknown" circuit.

The function and operation of this portion of the invention will be later described in detail.

The function of that portion of the network herein referred to as the "memory" circuit is to retain or record the voltage drop across the resistors, which is produced by passing an accurately standardized current through the resistors being tested, namely resistors 12, 13, and 14. A fine adjusting potentiometer 41 and a coarse adjusting potentiometer 42 are provided for each resistor that the completed unit is capable of checking. Since for purpose of illustration a unit having a capacity of three resistors was chosen, it can be seen that there are three sets of adjusting potentiometers 41, 42 and that these potentiometers are connected in series. The wiper arms of the potentiometers 41 and 42 are connected to the terminals of the rotary switch 11 as shown in the drawing. Also connected in series with the adjusting potentiometers, are a switch 43, a voltage supply 44, three control potentiometers 45, 46, and 47 and two precision resistors 48 and 49. The exact functioning of each of these components will be seen when the operational procedure of the network is described.

A precision resistor 51 is connected across terminals X and Y of switch 11 and a standard cell 52 is connected to one end of resistor 51. Lead 53 connects the positive terminal of the standard cell 52 to terminal A of switch 55. Lead wire 56 connects terminal B of switch 55 to the contact arm of resistor 48. A galvanometer 57 is connected to terminals E and F of switch 55 and resistors 58 and 59 may be placed in series with the galvanometer to give reduced sensitivity. Switches 61, 62, and 63 are used to control the desired sensitivity of the galvanometer 57.

The following table lists the values which may be employed for the various resistors of the "memory" circuit:

| Resistor No.: | Value in ohms |
| --- | --- |
| 41 | 0–10,000 |
| 42 | 10 |
| 45 | 0–20,000 |
| 46 | 0–1,000 |
| 47 | 0–100 |
| 48 | 0–20 |
| 49 | 175 |
| 51 | 10,000 |

The third portion of the network, which is referred to herein as the "microvoltmeter" circuit is connected to the "unknown" circuit portion through lead 33 and reversing switch 34. Lead wire 64 connects reversing switch 34 to terminal D of switch 55 thus connecting the galvanometer 57 and consequently the "memory" circuit to the "microvoltmeter" circuit.

The function of the "microvoltmeter" circuit is to compare the stored voltage drop in the "memory" circuit, for a particular resistor, with the voltage drop of the same resistor in the "unknown" circuit, the resistor being in a heat environment area, and normally having undergone a change in resistance value. The "microvoltmeter" circuit will compare the voltage drops and will indicate the potential difference on a current responsive means 71, for example, a milliammeter. Resistors 72 and 73 can be shunted across the current responsive means 71 by changing the position of switch 74, thus changing the sensitivity of the current responsive means 71.

A switch 75 is connected between the positive terminal of a voltage supply 76 and terminal M of reversing switch 34. Resistors 77 to 82, inclusive, are connected as shown in the drawing and these resistors are used to null the galvanometer 57, which when nulled indicates a balance of the entire network and the potential difference for a given resistor at different temperatures is indicated on the current responsive means 71.

The following table lists the values which may be employed for the various resistors of the "microvoltmeter" circuit:

| Resistor No.: | Value in ohms |
| --- | --- |
| 77 | 50 |
| 78 | 0–10,000 |
| 79 | 0–1,000 |
| 80 | 0–1,000 |
| 81 | 100 |
| 82 | 1 |

For proper operation of the network described herein, a step by step operational procedure must be followed so that the correct reading on the current responsive means 71 will be produced, this reading being the difference of the voltage drops of a particular resistor at different temperatures, and having a standard current, the difference of the voltage is directly proportional to the change in resistance, which is the desired factor to be obtained by the invention described herein.

The following procedural operations, each of which will be described later in detail, must be taken in sequential order:

(a) Secure resistors of unknown temperature coefficients in position.
(b) Adjust potential drop across resistors 48, 49, and 51 to be equal to E.M.F. of the standard cell 52.
(c) Standardize the "memory" circuit.
(d) Standardize the "unknown" circuit.
(e) Record in the "memory" circuit the voltage drop of each resistor to be tested, at a given temperature ($T_1$).
(f) Change ambient temperature of resistors under test to a different value ($T_2$).
(g) Compare the new voltage drop of each resistor at temperature $T_2$ with the voltage drop recorded in the memory circuit.

The first procedural step (a), is to fasten, as by soldering or clipping, the resistors that are to be tested to determine their temperature coefficients to the terminals of switching means 11, which might be a rotary switch. It can be seen that the switching means 11 has a two prong tap and that as shown in the drawing it is connected across resistor 12. The switching means can then be rotated to check the potential drop across the other resistors, which for purposes of illustration only show a total of three resistors. Switch 15 is then adjusted to a resistance value next higher in value than the resistance of the units being checked and remains in this position throughout the remainder of the test. For example, if resistors 12, 13 and 14 are each 90 ohms, then the contacting arm of switch 15 would be connected to resistor 18, which has a value of 100 ohms.

The next procedural step is to adjust resistor 48 in the "memory" circuit to a resistance value such that when the current flowing from the voltage supply 44 is later adjusted to .0001 ampere, then the total voltage drop across resistors 51, 49 and 48 will be equal to the E.M.F. of the standard cell 52. By way of example, if a standard cell is chosen that has an E.M.F. of 1.018 v. D.C., then the total resistance of resistors 51, 49, and 48 should be 10,180 ohms, since $E=IR$ or $1.018=.001R$, then $R=10,180$ ohms. Since resistor 51 has a value of 10,000 ohms, and resistor 49 has a value of 175 ohms, resistor 48 would be adjusted to give 5 ohms. In practice, resistor 48 could be a shaft-type potentiometer, and a dial having indicia thereon representing various values of voltages for standard cells could be attached to the potentiometer shaft and the desired value of resistor 48 could readily be set in the circuit without having to check the resistance value.

As stated above, if the "memory" circuit were carrying .0001 amp current, then the voltage drops across resistor 51, 49, and 48 should be equal to the E.M.F. of the standard cell The next operational step is then to adjust resistors 45, 46, and 47 until the desired current of .0001 ampere is carried by the circuit. This step is referred to as (c) above and is designated as standardizing the "memory" circuit. Switch 43 should first be closed and remain closed throughout the remainder of the test. Galvanometer 57 is put in circuit with the "memory" circuit by switching switch 55 to terminals A—B. The galvanometer 57 will then indicate the difference between the E.M.F. of the standard cell 52 and the voltage drop across resistors 51, 49, and 48. If the galvanometer does not zero or null, then resistors 45, 46, and 47 should be adjusted until the galvanometer does null.

After the "memory" circuit has been standardized as set forth above, the next procedural operation is to standardize the "unknown" circuit. Switch 15 should first be checked to see that it is connected to a resistance value next higher in value than the resistance of the units being checked. As switch 16 is mechanically connected to switch 15 it will be automatically positioned so there will be approximately the desired overall resistance in the "unknown" circuit in order that the voltage drop across the "unknown" circuit can be made equal to the voltage drop across the "memory" circuit. Switch 31 is then closed and remains closed throughout the remainder of the test. Switch 75 in the "microvoltmeter" circuit should be open, switch 55 should contact terminals C—D and switch 11 in the "unknown" circuit should contact terminals P—Q, which will also connect terminals X—Y in the memory circuit. With the galvanometer 57 now in circuit, resistors 22–27, inclusive, are adjusted until the galvanometer nulls, thus indicating that the voltage drop across terminals P—Q in the "unknown" circuit is equal to the voltage drop across terminals X—Y in the "memory" circuit.

The "memory" circuit and "unknown" circuit having been standardized, the next operation is to record in the "memory" circuit the voltage drop of each resistor to be tested (12, 13 and 14). Switch 75 should be opened and switch 55 connected to terminals C—D. As shown in the drawing, switching means 11 is connected across resistor 12, and resistors 41 and 42 in the "memory" circuit should be adjusted until galvanometer 57 nulls. Similar procedure should be followed for the remainder of the resistors to be tested for temperature coefficients.

The voltage drops being now recorded for a given temperature ($T_1$), the resistors being checked are then placed in a different temperature environment and allowed to become stabilized. The "memory" circuit and "unknown" circuit should again be standardized to correct for any drift or change in the respective circuits. Power switch 75 is then closed, and switch 11 is switched to the first resistor to be checked (12). The "microvoltmeter" circuit is then adjusted by adjusting resistors 78–80, inclusive, until galvanometer 57 nulls. The difference between the original voltage drop recorded for temperature ($T_1$) and the present voltage drop at temperature ($T_2$) is indicated on the current responsive means 71. This reading is recorded, and like procedure followed for the remainder of the resistors being checked. Reversing switch 34 insures a positive reading on meter 71, if per chance a negative coefficient is present in the resistors.

Although the procedure described herein is one for determining the temperature coefficients of resistor, it should be understood, of course, that the network described herein might be used to perform many other useful operations. For example, the network described herein might be used in conjunction with strain gauges to determine a change in condition. The circuit described herein might be connected to a plurality of strain gauges, and a reading taken on each gauge for a given condition. The individual readings are recorded in the "memory" circuit. A load can then be applied or removed, as the case may be, and a second reading taken and compared with the recorded reading. Meter 71 will indicate the change, if any, of the strain gauges.

It should also be understood that the foregoing disclosures relates to only a preferred embodiment of the invention and that numerous modifications or alterations may be made therein without departing from the spirit and the scope of the inventions.

What is claimed is:

An electrical network for measuring resistance changes in a plurailty of resistance elements comprising: a plurality of resistance elements to be tested, said resistance elements haivng end terminals and being connected in series; a galvanometer; first switching means connectible with said end terminals of said resistance elements and said galvanometer for selectively connecting one each of said resistance elements in series with said galvanometer; a first voltage source connected across the series combination of said plurality of resistance elements for creating a voltage drop across each said resistance element; a second voltage source; a first plurality of variable resistors connected in series with said second voltage source, at least one of which is connectible in series with said galvanometer and a corresponding one each of said resistance elements by said first switching means whereby said first plurality of variable resistors are used to null said galvanometer when said plurality of resistance elements to be tested are at a first temperature; a microvoltmeter closed series circuit including a third voltage source and a current responsive means, said current responsive means being connected in series with said third voltage source through a second plurality of variable resistors; and second switching means adaptable for connecting said current responsive means of said microvoltmeter circuit in series with said galvanometer and one each of said resistance elements to be tested selectively connected by said first switching means whereby said second plurality of variable resistors are used to null said galvanometer when said microvoltmeter circuit is connected in series with said galvanometer and said resistance elements to be tested are at a temperature different from said first temperature.

References Cited in the file of this patent

UNITED STATES PATENTS

| | | |
|---|---|---|
| 1,164,032 | Thomas | Dec. 14, 1915 |
| 1,379,266 | Keeler | May 24, 1921 |
| 2,083,408 | Stein | June 8, 1937 |
| 2,365,706 | Keinath | Dec. 26, 1944 |
| 2,463,384 | Holmqvist | Mar. 1, 1949 |
| 2,659,234 | Harrison | Nov. 17, 1953 |

FOREIGN PATENTS

| | | |
|---|---|---|
| 691,633 | Great Britain | May 20, 1953 |

OTHER REFERENCES

Hovnanian: "Meas. of Temp. Coeff. of Resistance," Instruments and Automation, vol. 28, No. 8, August 1955, pp. 1324–1326.

UNITED STATES PATENT OFFICE
CERTIFICATE OF CORRECTION

Patent No. 2,942,183   June 21, 1960

Richard F. Chance

It is hereby certified that error appears in the printed specification of the above numbered patent requiring correction and that the said Letters Patent should read as corrected below.

Column 4, line 62, for the equation "E=1R or 1.018=.001R," read -- E=IR or 1.018=.0001R, --; column 6, line 18, for "plurailty" read -- plurality --; line 20, for "haivng" read -- having --.

Signed and sealed this 29th day of November 1960.

(SEAL)
Attest:

KARL H. AXLINE
Attesting Officer

ROBERT C. WATSON
Commissioner of Patents